United States Patent [19]

Dyer et al.

[11] Patent Number: 5,057,823
[45] Date of Patent: Oct. 15, 1991

[54] PROBE FOR SENSING THE PRESENCE OF LIQUID IN A CONTAINER

[75] Inventors: John J. Dyer, Shoreview; Burt N. Shackle, Jr., Coon Rapids, both of Minn.

[73] Assignee: IMI Cornelius Inc., Anoka, Minn.

[21] Appl. No.: 491,879

[22] Filed: Mar. 12, 1990

[51] Int. Cl.$^5$ ............................................. G08B 21/00
[52] U.S. Cl. ................................. 340/620; 73/304 R; 73/864.24; 324/663
[58] Field of Search ................. 340/620, 450.1, 450.3; 324/690, 663, 693, 697, 722, 724; 73/304 CR, 864.24, 304 R, 49.2 R, 49.2 T, 45.5; 137/101.25, 131, 141, 144, 395, 397

[56] References Cited

U.S. PATENT DOCUMENTS

| 2,426,252 | 8/1947 | Thomson | 200/236 |
| 2,792,566 | 5/1957 | Shanhouse et al. | 340/620 |
| 3,131,335 | 4/1964 | Berglund et al. | 361/178 |
| 4,227,173 | 10/1980 | Clark | 340/620 |
| 4,503,383 | 3/1985 | Agar et al. | 324/663 |
| 4,759,475 | 7/1988 | Munthe | 222/464 |
| 4,806,847 | 2/1989 | Atherton et al. | 340/620 |
| 4,902,962 | 2/1990 | Ishikawa | 324/690 |

FOREIGN PATENT DOCUMENTS 2900960 7/1979 Fed. Rep. of Germany ... 73/49.2 T
0454901 6/1968 Switzerland ..................... 73/304 R Primary Examiner—Donnie L. Crosland
Assistant Examiner—Jill Jackson
Attorney, Agent, or Firm—Sten Erik Hakanson

[57] ABSTRACT

The present invention is a liquid sensing device used for in determining the presence or absence of liquid in a container by the presence or absence of electrical current flow between two conductive probes. Moreover, the present invention prevents the false indication of liquid as can result from the presence of foam, or from bridging of the probes at the proximal ends thereof. A main body portion is formed of an electrically conductive material and has a probe channel extending therethrough. A non-conductive plug is inserted into the proximal end of the probe channel and provides for the retaining of a conductive probe that extends along the central axis of the probe channel. An end cap is secured to the distal end of the main body and covers the distal end of the probe channel for preventing foam access into the probe channel. An inlet port is formed through the main body into the probe channel at the distal end thereof for allowing restricted access of the liquid into the probe channel when the present invention is inserted into the container. The proximal end plug includes an air tight cavity that physically isolated the proximal ends of the probe and the conductive main body from the liquid.

17 Claims, 3 Drawing Sheets

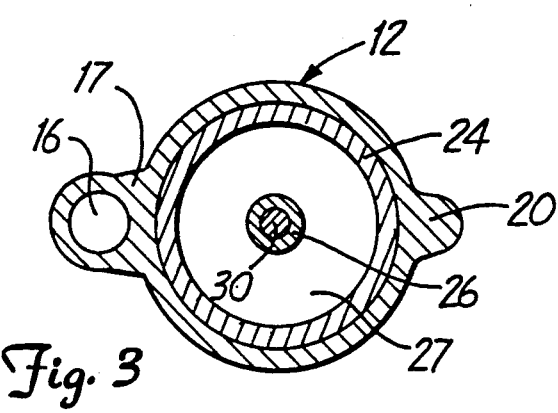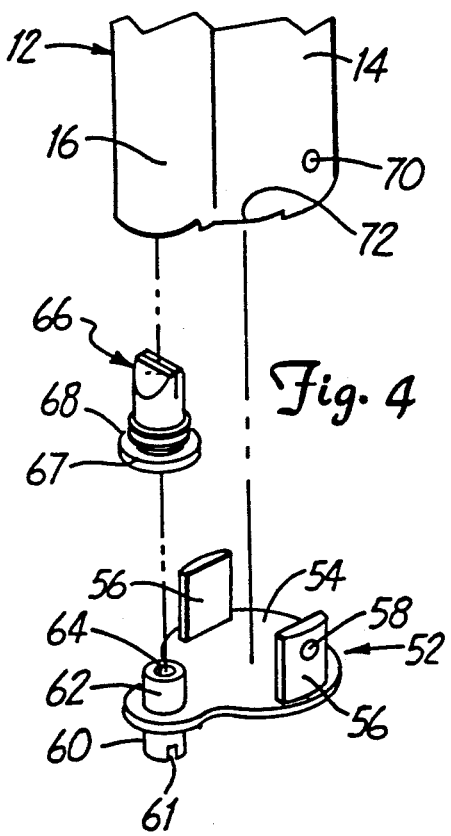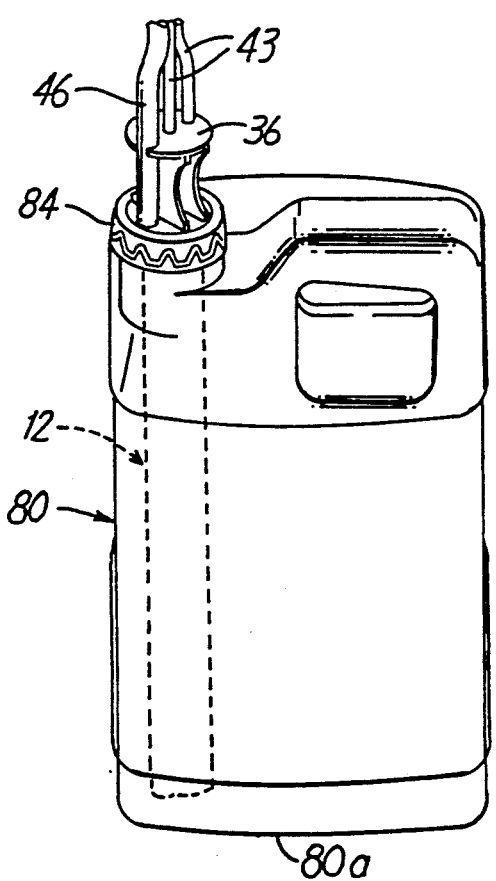

PROBE FOR SENSING THE PRESENCE OF LIQUID IN A CONTAINER

BACKGROUND:

1. Field of the Invention.

The present invention relates generally to electrical conductivity liquid sensing devices, and more particularly, to such sensing devices that are designed to prevent the false indication of the presence of liquid.

2. Background of the Invention.

Many strategies are known for sensing the presence or absence of liquid in a container. In particular, various sensors are known that use a pair of electrically conductive probes that extend into the container, wherein the liquid provides for conductivity between the probes. Thus, if a potential is applied across the probes and a current flow is sensed, the presence of liquid in the container is indicated. Conversely, when current no longer flows between the probes, that is an indication that the container is empty.

However, prior art sensors of this type experience difficulties if the liquid being sensed has any tendency to foam, such as is the case with cleaning solutions, and the like. The difficulty arises wherein such prior art probes are not able to differentiate between the liquid itself and the foam it produces. Thus, foam can indicate the presence of liquid when, in fact, the container is empty.

Further problems with such electrically conductive probes arise when the liquid forms an electrically conductive bridge from one probe to another, falsely indicating the presence of liquid. Such bridging typically occurs at the proximal end of the probe adjacent the top of the container. In this situation, the liquid contacts a proximal end or cap surface, and flows there along between the probes. This form of bridging has been found to be very persistent, especially in the enclosed environment of a container wherein the bridging liquid does not readily dissipate or dry out. Moreover, it has been found that conductivity occurs even after the drying out of the liquid, as the residue left behind can often times be sufficiently conductive.

Accordingly, it would be very desirable to have an electrical conductivity liquid sensing probe that is not susceptible to false readings as a result of liquid foaming, and prevents the forming of electrically conductive bridges between the probes.

SUMMARY OF THE INVENTION

The present invention is a level sensing probe for insertion into a container of liquid. The probe includes a main body portion made of a conductive material. The probe body includes a main probe channel extending therethrough, and a liquid withdrawing channel extending there along and separate therefrom. An end plug, made of a non-conductive material, is sized for close fitting insertion into the proximal end of the main channel. The end plug includes a perimeter skirt portion and a probe support portion extending essentially centrally of the skirt portion. Both the skirt and probe support extend into the main channel. The cap further provides for insertion fitting and retention therein of a conductive probe. The probe is held by the end plug and extends centrally of the probe channel and terminates prior to the distal end thereof. Both the probe and the conductive main body are separately connected to a source of electrical power and to a current sensing means, and are electrically insulated from each other by the proximal end plug. The plug also includes a plate portion for cooperating with a container cap for providing securing of the present invention in a container.

The main body portion includes a distal end for insertion into the liquid container. An end cap is releasably connected to the distal end of the probe channel and provides for covering thereof. A check valve is sized for insertion into the distal end of the liquid withdrawing channel and resides between the withdrawing channel distal end and the end cap. The end cap includes a check valve extension and a pore extending therethrough. The cap extension extends into the check valve for providing fluid communication from the interior of the container to the check valve, and for proper positioning and retaining of the valve.

The main body portion includes a pair of relief ports extending therethrough into the main probe channel adjacent the proximal end thereof below the lower perimeter edge of the skirt portion. The distal end of the probe channel includes a cut-away portion, forming an inlet port between the distal end of the probe channel and the end cap.

In operation, the present invention is inserted vertically into a container of liquid and retained therein by use of a screw cap threadably engaging a container opening, the distal end plug plate secured between the opening and the screw cap. As the distal end of the present invention is inserted into the container, eventually to reside at a position adjacent the bottom thereof, the end cap prevents the liquid, and any foam on the surface thereof, from directly entering the probe channel. The small inlet port provides the only access for the fluid into the probe chamber and, therefor, only liquid will be present in the probe channel. It can also be appreciated that the small inlet port prevents any foam from subsequently entering the probe channel after insertion. The presence of any liquid is indicated by a flow of current from the central probe to the conductive main body as detected by the current sensing means.

The perimeter skirt and probe support extension define an air tight cavity in the proximal end cap. This cavity is held above the level of the liquid and is filled with air from the initial insertion of the present invention into the container. The relief ports allow the liquid to rise in the probe channel to the level thereof, however it can be appreciated that, as the port is below the level of the cavity, the liquid will be prevented from rising any further in the probe channel due to the air trapped in the cavity. Thus, the contained liquid will not be able to directly bridge the gap between the probe and the probe channel by simultaneous contact of both the skirt and the probe support, nor will it be able to flow along the cavity surfaces and provide a conductive path between the probe and the conductive body.

DESCRIPTION OF THE FIGURES

Further objects, features, and advantages of the present invention will become evident in light of the following detailed description, which description refers to the following drawings, wherein:

FIG. 3 shows a cross-sectional view along lines 3—3 of FIG. 2.

FIG. 4 shows an enlarged exploded perspective view of the distal end of the present invention.

FIG. 5 shows an environmental view of the present invention retained in a liquid container.

DETAILED DESCRIPTION

Figure 1:
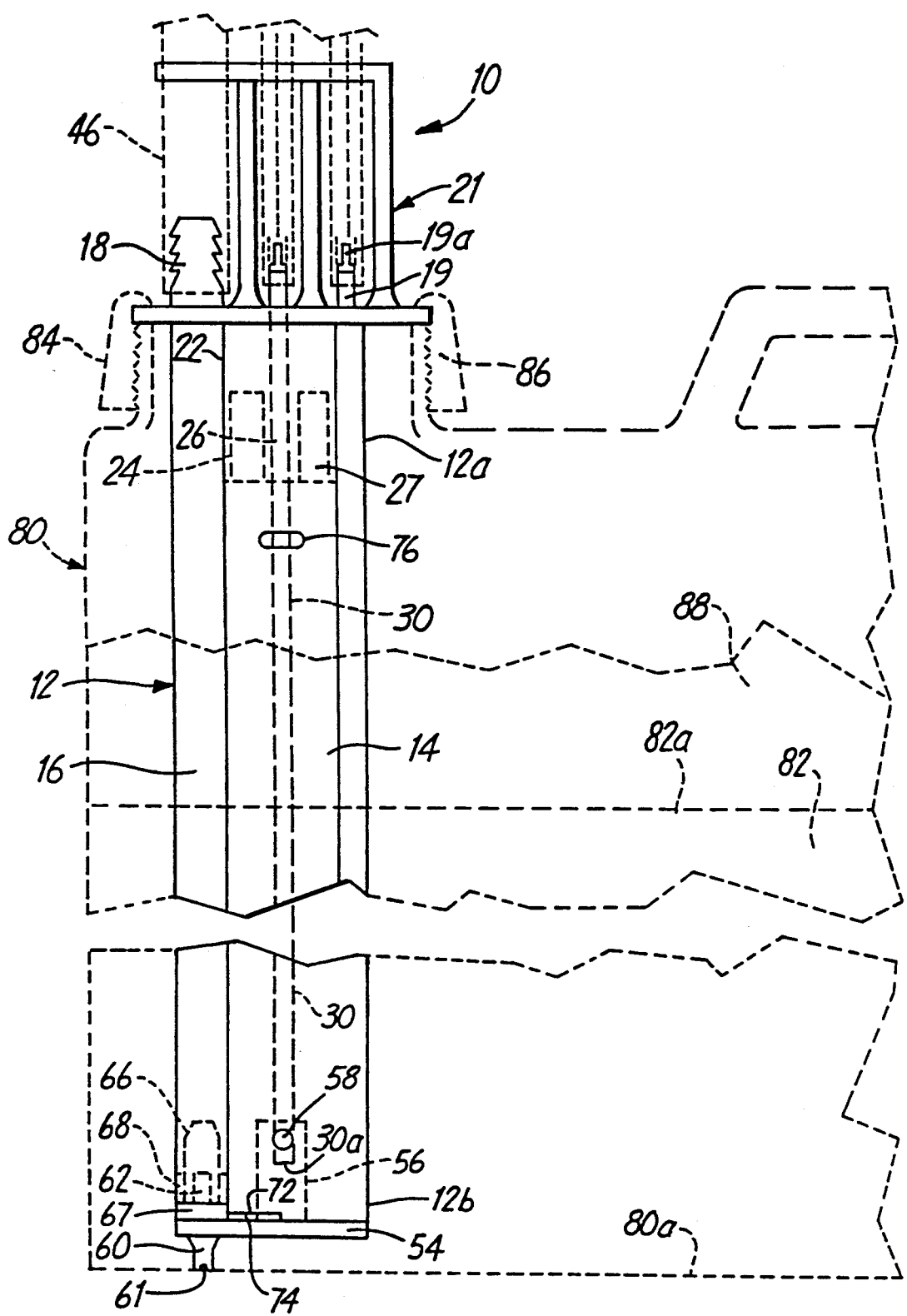
FIG. 1 shows a side view of the present invention.

Referring to the various figures, the present invention is generally indicated by the numeral 10. The level sensing device 10 includes a main elongate tubular body 12 having a proximal end 12a and a distal end 12b. Body 12 is made of a conductive plastic such as a carbon filled polypropylene. Body 12 includes a tubular probe channel 14 and a liquid withdrawing or suction channel 16. As seen in FIG. 4, channels 14 and 16 are fluidly separate and divided by a in FIG. 4, channels 14 and 16 are fluidly separate and divided by a wall 17. A tube fitting 18 is integral with channel 16 and an electrical contact extension 19 is integral with a solid reinforcing ridge 20 extending along the exterior surface of body 12. Extension 19 includes a metal electrical contacting pin 19a secured thereto.

A proximal end plug 21 is made of a suitable non-conducting plastic, such as polypropylene, and is sized to provide for tight insertion fitting into the proximal end 12a of body 12. Specifically, plug 21 has a slightly tapered exterior surface 22 which surface includes a skirt portion 24. Skirt 24 includes a perimeter edge 24a. A probe support 26 extends substantially centrally of skirt 24. Skirt 24 and probe 26 define an air-tight cavity 27 having interior walls 27a. A probe channel 28 extends through plug 21 and provides for insertion and retaining therein of a metal probe 30. Probe 30 is preferably made of stainless steel and extends substantially the length of channel 14 and terminates with a distal end 30a. Probe 30 includes a electrical contact fitting 31 secured to the proximal end thereof.

Wires 32a and 32b are releasably secured to pins 19a and 31 respectively by wire contact ends 33. Wires 32a and 32b are protected by plastic tubes 43 extending there around. Wires 32a and 32b are connected to a source of electrical current and to current sensing means, not shown.

Plug 20 also includes a closure cap retaining plate 32 having a pair of tube guide plate risers 34 integral therewith and extending upwardly therefrom and integral with a tube guide plate 36. Cap plate 32 includes a hole 38 and a hole 40 for permitting extension of channel tube fitting 18 and extension 19, respectively therethrough. Tube guide plate 36 includes holes 42a and 42b for providing extension therethrough and retaining therein of tubes 34. Plate 36 also includes a hole 44 for providing extension therethrough and retaining therein of a tube 46. Tube 46 is connected to fitting 18 for providing liquid communication to a pump, not shown.

The distal end 12b of tubular body 12 includes an end cap 52. Cap 52 includes a flat probe channel covering portion 54 which includes a pair of resilient retaining arms 56 integral therewith and extending upwardly therefrom. Arms 56 each include a round protrusion 58 thereon. Cap 52 also includes a lower extension portion 60, having a notch 61, and an upper extension portion 62, each portion 60 and 62 having a common withdrawing channel 64 extending therethrough. A duck-bill check valve 66, has a retaining flange 67 and a sealing ring 68 for providing sealing engagement of valve 66 in suction channel 16. As seen in FIG. 1, flange 67 of check valve 66 is held between cap 52 and body 12, with cap 52 secured to distal end 12b by snap fitting engagement of protrusions 58 of retaining arms 56 extending into holes 70. Body 12 includes a cut-away portion 72 forming an inlet port 74 for providing fluid communication into probe channel 14 through the vertical face of body 12. A pair of relief ports 76 extend through body 12 on either side thereof into channel 14 at a position thereon below skirt edge 24a.

As seen in FIGS. 1 and 5, probe 10 is inserted into a container 80 having a liquid 82 therein. Probe 10 is held in container 80 by a closure cap 84, threadably engaged with a container opening 86 for holding plate 32 therebetween. After insertion into container 80, the liquid 82 flows slowly into channel 14 through inlet port 74. It can be understood that liquid 82 provides for electrical contact between probe 30 and conductive body 12. Thus, wires 32a and 32b provide for connection to an electrical power source and a current sensing means thereby indicating the presence or absence of liquid in container 80 by the presence or absence of a sensed current. It can be appreciated that as probe 10 is inserted into container 80, any foam 88 that may be present on the surface 82a of the liquid is prevented from directly entering channel 14 by virtue of plate 54 of end cap 52. Thus, such foam cannot cause a false level reading by creating conductivity between probe 30 and conductive body portion 12. Moreover, the relatively small size and position of inlet port 74 also serves to prevent the entry of any foam into channel 14, particularly as the level 82a of liquid 82 reaches the container bottom 80a. An empty condition will be indicated when the liquid level goes below the distal end point 30a of probe 30. It can be understood that an empty condition will be sensed prior to container 80 being completely empty as probe end 30a terminates above the container bottom 80a. If liquid 82 is very viscous a portion thereof may cling to probe 30 after the level thereof has gone below end 30a but before the liquid is out of contact with body 12. Thus, it will be understood that the length of probe 30 can be varied to account for the type of liquid being dispensed so that probe 30 and the liquid break contact prior to the liquid being below a desired volume or point. In addition, it can be seen that extension 60 can be used to provide for the withdrawing of liquid from the lowest point of a container wherein such ability is desirable, as for example, due to the viscosity of the liquid. Moreover, notch 61 provides for fluid communication into pore 64 where extension 60 may be flush with container bottom 80a. Cap 52 is preferably plastic and can be conductive or non-conductive depending upon the depth in the container to which conductivity with body 12 is desired.

The liquid 82 is withdrawn from container 80 by action of a pump, not shown, connected to channel 16 by tube 46. It can be appreciated that valve 66 serves to prevent agitation of liquid 82 that may occur as the liquid 82 moves alternately forwardly and backwardly in channel 16 due to the cycling action of the pump.

Figure 2:
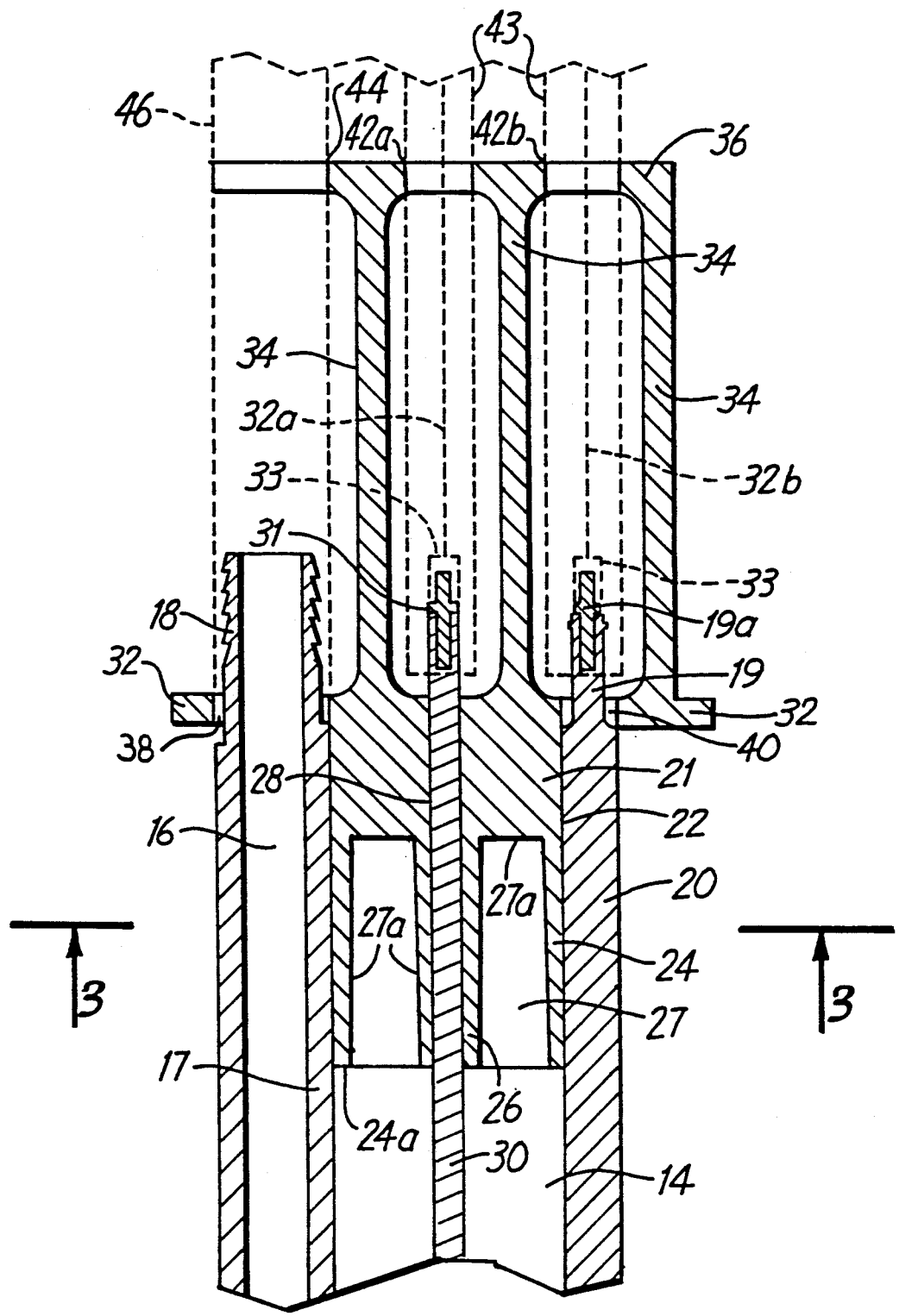
FIG. 2 shows an enlarged cross-sectional view of the proximal end of the present invention.

As seen in FIGS. 2 and 4, cavity 27 is air-tight. Thus, the liquid 82 can travel up channel 14 to the point of relief port 76, but cannot extend much past that point as a result of the air trapped in cavity 27. It can now be appreciated that cavity 27 prevents any liquid from creating a conductive bridge directly between probe 30 and conductive body 12 or indirectly between probe 30 and body 12 along cavity surfaces 27a.

The present invention has been described herein with reference to various preferred embodiments. However, those of skill in the art will recognize that changes may be made in form and detail to the present invention without departing from the spirit and scope thereof.

We claim:

1. A probe device for insertion into a container for use in indicating the presence of a liquid held within the container, the probe comprising: a conductive body portion having a probe channel extending therethrough from a proximal end to a distal end, a proximal end closure means, the closure means for sealing of the proximal end of the probe channel, the closure means for retaining a conductive probe and for insulating the conductive probe from the body portion, and the closure means providing for extension of the probe through the probe channel, and the body portion having a relief hole extending therethrough into the probe channel and located on the body portion at a point there along towards the proximal end, a liquid excluding air space between the body portion proximal end and the relief hole for preventing the liquid or any condensed fraction thereof from forming a conductive path between the probe and the body portion, and a suction channel extending along the body portion and fluidly separate from the probe channel for extracting the liquid there through from the container.

2. The device as defined in claim 1, and further including covering means for preventing any foam fraction and the like of the liquid from entering the probe channel through the distal end when the probe device is inserted into the container, and including aperture means for permitting entry into the probe channel of the liquid.

3. The device as defined in claim 2, and the covering means comprising a cap releasably securable to the body portion distal end and the aperture means comprising a narrow opening formed between the cap and the body portion distal end.

4. The device as defined in claim 1, and the proximal end closure means including means for providing securing of the sensing probe device to the container.

5. A probe device for insertion into a container for use in indicating the presence of a liquid held within the container, the probe device, comprising:

an elongate conductive body portion having a proximal end and a distal end and the body portion defining a probe channel extending therethrough from the proximal end to a distal end opening of the distal end, non-conductive proximal end means for sealing of the probe channel at the proximal end of the body portion, conductive probe means secured to the non-conductive sealing means and extending through the probe channel and terminating therein adjacent the body portion distal end, a relief hole on the conductive body portion extending therethrough into the probe channel and located on the body portion at a point there along towards the proximal end, means for covering of the probe channel distal end opening for preventing any foam fraction and the like of the liquid from entering the probe channel when the probe device is inserted into the container, and an inlet port at the body portion distal end for providing fluid communication into the probe channel of the liquid to the substantial exclusion of any foam fraction or the like thereof when the distal end covering means is covering the distal end opening, the body portion including a suction channel extending there along and fluidly separate from the probe channel, the suction channel for connecting to a pumping means for providing removing of the sensed liquid from the container through the suction channel, and the probe means and the body portion including means for providing electrical connection thereof to a source of electrical power and to conductivity sensing means.

6. The device as defined in claim 5, and the proximal sealing means defining a cavity therein extending around a portion of the conductive probe means between the sealing means and the relief hole for providing an air space there around for preventing access therein of the sensed liquid or any condensate fraction thereof.

7. The device as defined in claim 5, and the nonconductive proximal sealing means including means for providing securing of the probe to the container.

8. The device as defined in claim 5, and the distal end covering means comprising a cap, and the cap releasably securable to the body portion distal end and the inlet port defined between the cap and the body portion distal end.

9. The device as defined in claim 5, and the proximal end sealing means comprising a proximal end plug for sealing inserting into the probe channel end of the body portion.

10. The device as defined in claim 5, and the suction channel including check valve means for providing one-directional flow of the sensed liquid therethrough from the container to the pumping means.

11. A liquid level probe device for insertion into a container for use in indicating the presence of a liquid held within the container, the probe device, comprising:

an elongate conductive body portion having a proximal end and a distal end and the body portion defining a probe channel extending therethrough from the proximal end to a distal end opening of the distal end, non-conductive proximal end means for sealing of the probe channel at the proximal end of the body portion, conductive probe means secured to the non-conductive sealing means and extending through the probe channel and terminating therein adjacent the body portion distal end, a relief hole on the conductive body portion extending therethrough into the probe channel and located on the body portion at a point there along towards the proximal end, a cavity extending around a portion of the probe between the relief hole and the proximal end sealing means for providing an air space therearound for preventing access therein of the sensed liquid or any condensate fraction thereof, and an inlet port at the body portion distal end for providing fluid communication into the probe channel of the liquid to the substantial exclusion of any foam fraction or the like thereof when the distal end covering means is covering the distal end opening, the body portion including a suction channel extending there along and fluidly separate from the probe channel, the suction channel for connecting to a pumping means for providing removing of the sensed liquid from the container through the suction channel, and the probe means and the body portion including means for providing electrical connection thereof to a source of electrical power and to conductivity sensing means.

12. The device as defined in claim 11, and the proximal end sealing means including means for providing securing of the probe device to the container.

13. The device as defined in claim 11, and the suction channel including check valve means for providing one-directional flow of the sensed liquid therethrough from the container to the pumping means.

14. The device as defined in claim 11, and the distal covering means comprising a cap, and the cap releasably securable to the body portion distal end and the inlet port defined between the cap and the body portion distal end.

15. The device as defined in claim 14, and the cap including means for retaining a check valve for releasable inserting into the suction channel when the cap is secured to the body portion distal end.

16. The device as defined in claim 11, and the proximal end sealing means comprising a proximal end plug for sealing inserting into the probe channel end of the body portion.

17. The device as defined in claim 16, and the plug forming the cavity around the probe means.

* * * * *